United States Patent [19]
Pierce

[11] Patent Number: 5,794,949
[45] Date of Patent: Aug. 18, 1998

[54] COLLET

[75] Inventor: Kenneth R. Pierce, N. Barrington, Ill.

[73] Assignee: The E. H. Wachs Company, Wheeling, Ill.

[21] Appl. No.: 803,575

[22] Filed: Feb. 21, 1997

Related U.S. Application Data

[62] Division of Ser. No. 564,781, Nov. 29, 1995, Pat. No. 5,605,084.

[51] Int. Cl.⁶ .................................................. B23B 31/20
[52] U.S. Cl. ............................ 279/46.7; 279/54; 279/51
[58] Field of Search ........................ 279/46.7, 51, 48, 279/49, 57–59, 46.8, 53, 54, 55; 82/113; 408/104, 106, 107

[56] References Cited

U.S. PATENT DOCUMENTS

| | | | |
|---|---|---|---|
| 574,077 | 12/1896 | Sellers | 279/59 |
| 2,631,860 | 3/1953 | Bronson | 279/46.7 |
| 2,835,496 | 5/1958 | Hall | 279/46.7 |
| 3,451,686 | 6/1969 | Hammond | 279/51 |
| 4,867,463 | 9/1989 | Hopf | 279/46.7 |
| 5,076,122 | 12/1991 | Katzenburger et al. | 82/113 |
| 5,605,084 | 2/1997 | Pierce | 82/113 |
| 5,619,893 | 4/1997 | Pierce | 82/113 |

FOREIGN PATENT DOCUMENTS

| | | | |
|---|---|---|---|
| 4280 | of 1874 | United Kingdom | 279/59 |
| 587076 | 4/1947 | United Kingdom | 279/51 |

*Primary Examiner*—Steven C. Bishop
*Attorney, Agent, or Firm*—Patnaude, Videbeck & Marsh

[57] ABSTRACT

A collet for retaining a work piece comprises a plurality of wedge segments, and each of the wedge segments has inner and outer surfaces which, when the segments are assembled, form a collet having a cylindrical bore and a frustonconical outer surface, and the segments are retained in aligned relationship within a nut attachable to the machine.

2 Claims, 1 Drawing Sheet

COLLET

The present application is a division of the applicant's prior application now U.S. Pat. No. 5,605,084 bearing Ser. No. 08/564,781 filed Nov. 29, 1995 and issued Feb. 25, 1997.

The present invention relates to machines used to square the ends of pipes, tubes, or fittings, and in particular to a collet used in such machines.

BACKGROUND OF THE INVENTION

Tube squaring machines are required to precision cut a square surface at the end of a piece of pipe or a tube, such that a precision weld can be made for attachment of the pipe or tube to a fitting or to an adjacent length of pipe or tube. Similarly, squaring machines are used to cut a square surface at the end of a fitting for the attachment of a fitting to a length of pipe or tube. In many cases, a tube or fitting must have a square end and the cut must be to an exact length.

Existing squaring machines grip the end of the tube in a collet to hold the axis of the tube aligned with the axis of a rotating cutter which will remove a portion of the metal at the end of the tube such that the end thereof will be square.

To cut a square end to a piece of pipe or tubing, existing machines have a collet retainer at the end of the machine for receiving a collet to clamp the end of the tube in the desired orientation. Such retainers have a tapered bore into which a complementary shaped frustoconical collet is fitted, and a nut is threaded over one end of the retainer to force the collet within the tapered bore to compress it around a pipe or tube. To retain the end of a work piece in such a squaring machine, one must first slide the retaining nut over the end of the work piece, fit the end of the work piece into a collet, fit the collet with the work piece therein into the tapered bore of the machine, and finally, tighten the nut against the collet.

Existing collets are generally made of a unitary piece of metal having elongate slots in the length. Such collets permit little expansion of the inner diameter from the compressed position in which the collet is locked against the outer surface of a work piece, and the relief position, in which the work piece can be removed from the collet.

It would be desirable to provide a collet for use in such a machine in which the expanded, relief position thereof is substantially larger than the compressed locked position, and further provide a collet which can be more easily fitted around a work piece than existing collets.

SUMMARY OF THE INVENTION

Briefly, a workpiece in the form of a length of tubing, is retained in a tube squaring machine by a collet assembly in a frustoconical collet retainer. The collet comprises a plurality of wedge segments each of which has an inner and outer surface. The inner surfaces of each of the segments is semi cylindrical, such that when the segments are assembled and compressed together to form a collet, the combined inner surfaces define a cylindrical bore through the assembled segments. The outer surfaces of each of the segments is a portion of a frustoconical surface, with a larger end and a smaller end, and the outer surfaces of the assembled segments define a single frustoconical surface having a large diameter end and a narrow diameter end. The large end of each of the segments has a groove in the outer surface thereof which will align with the grooves of adjacent segments when the segments are assembled and thereby form an annular groove around the large diameter end of the assembled segments. A nut for retaining the segments assembled to form a collet has an inner annular flange having a thickness a little narrower than the width of the grooves on the outer surfaces of the segments and the segments are retained in aligned relationship when they are positioned within the nut with the flange of the nut fitted in the grooves of the segments. An inner annular groove extends around a tubular protrusion at the large end of the assembled segments, and an O-ring fitted into the groove applies a radially outward force to the segments to retain them against the annular flange of the nut. The unit comprising the nut and the collet formed by the aligned segments can be threaded on the end of a retainer of a tube squaring machine having a frustoconical inner surface to retain a work piece in the machine.

GENERAL DESCRIPTION OF THE DRAWINGS

A better and more complete understanding of the present invention will be had from a reading of the following detailed description taken in conjunction with the accompanying drawings wherein:

FIG. 1 is a fragmentary cross-sectional view of the working end of a tube squaring machine having a retainer and a nut and collet in accordance with the present the invention; and FIG. 2 is an inside end view of the nut and collet shown in FIG. 1.

DETAILED DESCRIPTION OF A PREFERRED EMBODIMENT

Figure 2:
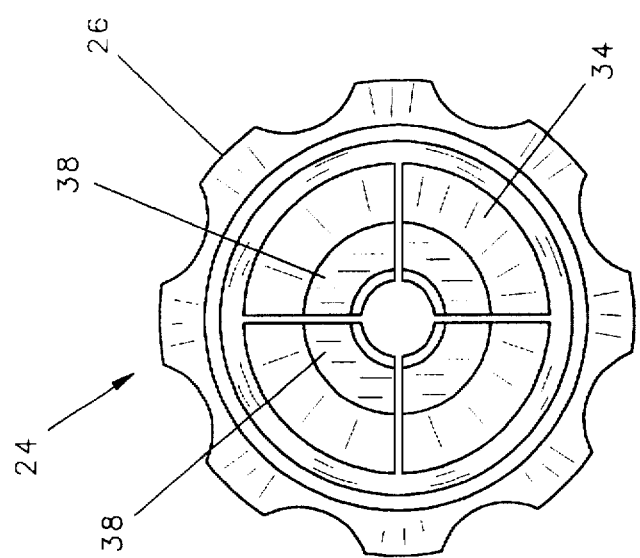
Figure 1:
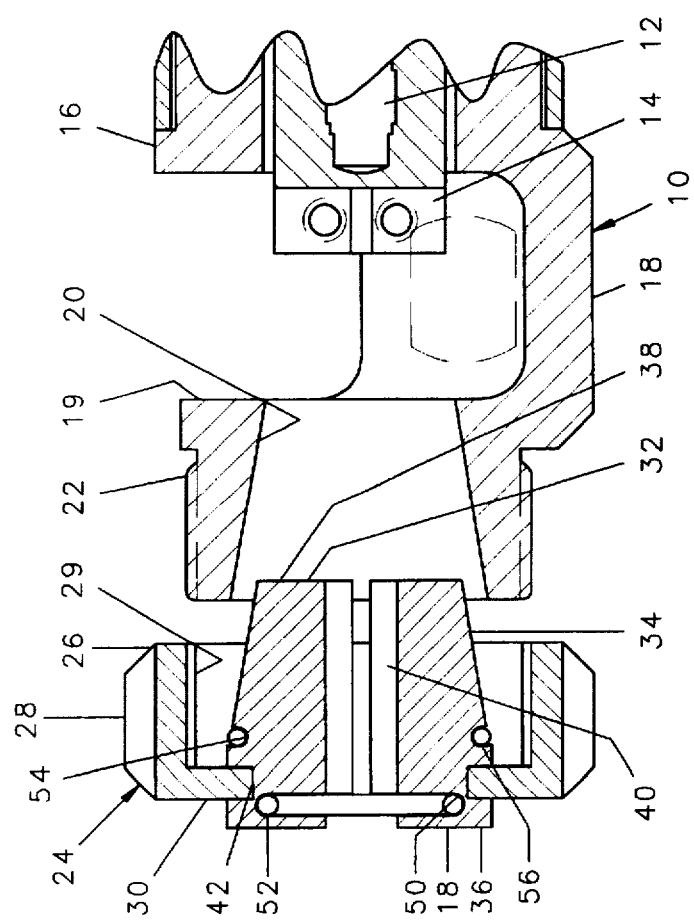

Referring to FIGS. 1 and 2, a tube squaring machine 10 has a rotating central shaft 12 with a cutting tool 14 attached to the forward end thereof. The machine 10 includes a housing 16 with an arm 18 at the forward end thereof, and in the forward end of the arm 18 is a generally tubular collet retainer 19 having a frustoconical inner surface 20 and a threaded cylindrical outer surface 22. The inner and outer surfaces 20, 22 respectively are co-axial and axially aligned with the axis of the shaft 12 such that a work piece retained therein will be in axial alignment with the tool 14.

A collet assembly 24 in accordance with the present invention includes a nut 26 having a plurality of ribs 28 on the outer surface thereof, and a threading 29 in the inner surface which are complementary to the threading 22 on the retainer 19. At the rear end of the nut 26 is an interior annular flange 30. Fitted over the flange 30 are a plurality of wedge segments 32. In this embodiment, four wedge segments 32 are depicted. Each of the wedge segments 32 has an outer surface 34 which is a portion of a frustoconical surface. In the embodiment depicted, each of the outer surfaces 34 is one fourth of a frustoconical surface such that when all four segments 32 are aligned adjacent to one another to form a collet 24 as depicted, the outer surfaces 34 define a single frustoconical surface complementary in shape to the frustoconical surface 20 of the retainer 19. Each of the wedge segments 26 has a large end 36, a small end 38, and an inner surface 40.

Each of the wedge segments 32 has a groove 42 around the larger end 36 thereof, and the grooves 42 of the segments align to form an annular groove around the outer surface 34 of the assembled collet 24. The annular groove has planar first and second side surfaces spaced apart a distance which is a little greater than the thickness of the annular flange 30 of the nut 26. The segments 32 are retained within the central opening of the nut 26 by fitting the grooves 42 thereof around the flange 30.

Each of the segments 32 further has an arcuate flange 48 along the outer edge of the larger end 36, and when the segments are assembled to form a collet 24, the arcuate flanges 48 define a cylindrical inner flange defining an undercut or groove 50 into which is fitted an O-ring 52. The O-ring 52 applies a radially outward force against the wedge segments 32 thereby retaining the grooves 42 of the segments 32 against the flange 30. The segments 32 further have a second annular groove 54 around the outer surfaces 34 for receiving a second O-ring 56 to retain the forward smaller ends 38 of the collet 24 in alignment with each other.

The inner surface 40 of each of the segments 32 defines a quarter of a cylindrical surface such that when the segments 32 are assembled adjacent one another, the combined inner surfaces 40 define a cylindrical inner bore adapted to receive a work piece of a given size. As can be seen in FIG. 2, when the segments 34 are assembled within the nut 26 and retained against the flange 30 by the O-ring 52, the segments will be spaced from one another such that the segments can be subsequently compressed together around a work piece. The segments 34 will be compressed around a work piece when the segments are forced into the frustoconical bore 20 of the retainer 19.

To retain a work piece within the collet 24 for squaring the end thereof, an operator will loosely thread a nut and collet 24 of the appropriate size to the threaded end of the retainer 19. Next the operator will insert a work piece in the generally cylindrical opening of the collet while it is retained in the expanded position by the first O-ring 52. When the operator determines the work piece is properly oriented within the collet, he or she will rotate the nut 26 by grasping the flanges 28 and tighten it against the retainer 19, and thereby compress the segment 32 within the frustoconical bore 20, and against a work piece.

Should the operator decide that a collet of a different size is required, the segments 32 of the collet can be removed from the nut 26 by threading the nut 26 and the collet 34 onto the retainer 19 without a workpiece in the bore of the collet. Without a workpiece between the segments 32, the segments can be compressed within the frustoconical bore of the retainer 19 until the flange 30 of the nut 26 no longer extends into the grooves 42. The nut 26 can then be unthreaded from the threadings 22 of the retained while the segments 32 remain within the frustoconical opening 20. The segments 32 can then be removed from the retainer 19, and another set of segments having inner surfaces 20 which form a collet of the desired size, and the associated O-rings, can be inserted into the retainer. When the nut 26 is again threaded on to the retainer 19 and the grooves of the new segments can be aligned around the flange 30 of the nut and the nut 26 with the new segments aligned thereon can then be loosened to receive a work piece.

It should be appreciated that although the retainer is depicted as having exterior threaded outer surface 22 on which the interior threads of the nut 26 are threaded, the segments 32 of the collet can be retained in any cylindrical member having an inner flange 30 or other means for retaining the segments in alignment. The cylindrical member could, by way of example, have exterior thread which are received in interior threads of a collet holder.

While the present invention has been described in connection with several embodiments, it will be understood by those skilled in the art that many changes may be made without departing from the true spirit and scope of the present invention. Therefore it is intended by the appended claims to cover all such changes and modifications which come within the true spirit and scope of this invention.

I claim:

1. A collet comprising in combination;

a plurality of wedge segments;

each of said wedge segments having an inner surface and an outer surface;

said outer surface of each of said segments defining a portion of a frustoconical surface;

said inner surface of each of said segments defining a portion of a cylindrical surface;

a tubular member having an inner surface;

a flange on one of said tubular member and said segments and a groove in the other of said tubular member and said segments, said groove complementary to said flange whereby said wedge segments are retained in mutual alignment within said tubular member with said inner surfaces defining a cylindrical center opening and said outer surfaces defining a frustoconical surface as a result of the mating of said flange into said groove for said plurality of wedge segments;

a second groove in said inner surface of each of said wedge segments, and an O-ring in said second grooves of said wedge segments for spreading said wedge segments radially outward and against said inner surface of said tubular member and thereby holding said segments in assembled relationship within said tubular member.

2. A collet in accordance with claim 1 and further comprising a second O-ring around said outer surface of said wedge segments.

* * * * *